US006632415B2

(12) United States Patent
Miller et al.

(10) Patent No.: US 6,632,415 B2
(45) Date of Patent: Oct. 14, 2003

(54) METHODS FOR MAKING MOLECULAR SIEVES

(75) Inventors: Stephen Joseph Miller, San Francisco, CA (US); Seymour Cherney, Richard, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 108 days.

(21) Appl. No.: 09/828,139

(22) Filed: Apr. 9, 2001

(65) Prior Publication Data

US 2002/0146367 A1 Oct. 10, 2002

(51) Int. Cl.[7] .......................... C01B 37/04; C01B 37/06; C01B 39/02
(52) U.S. Cl. ............... 423/700; 423/716; 423/DIG. 21; 423/DIG. 28; 423/DIG. 22; 423/DIG. 30; 423/305; 423/306
(58) Field of Search ................................. 423/700, 712, 423/716, DIG. 21, DIG. 28, DIG. 22, DIG. 30, 305, 306

(56) References Cited

U.S. PATENT DOCUMENTS

| 3,094,083 A | 6/1963 | Weeks |
| 3,119,659 A | 1/1964 | Taggart et al. |
| 3,119,660 A | 1/1964 | Howell et al. |
| 3,308,069 A | 3/1967 | Wadlinger et al. |

(List continued on next page.)

FOREIGN PATENT DOCUMENTS

| EP | 0 156 595 | 10/1985 |
| EP | 0 284 206 | 9/1988 |
| GB | 1 567 586 | 5/1980 |
| GB | 2 160 517 | 12/1985 |
| WO | WO92/12928 | 8/1992 |

OTHER PUBLICATIONS

Article: Jianquan Li et al., Zeolite Synthesis in the System Pentaerythritol–Na2SO4—Na2O—SiO2—Al2O3—CH3OH; Zeolites, 1992, vol. 12, Apr./May (pp 343–346).
Article: Xu Wenyang et al., Synthesis of Zeolite KZSM–48 in the Nonaqueous System K2O—H2N(CH2)6NH2—SiO2—Al2O3—(C2H5)3N, Zeolites 1990, vol. 10 Nov./Dec. (pp 753–759).
Article: Xu Wenyang et al., Nonaqueous Synthesis of ZSM–35 and ZSM–5 Zeolites, 1989 vol. 9, Nov. (pp 468–473).
Article: D.M. Bibby et al., Synthesis of Silica–Sodalite From Non–Aqueous Systems Letters to Nature, NZ, vol. 317 Sep. 12, 1995 (pp 157–158).
Article: Li Jianquan et al., Zeolite ZSM–35 Synthesized by the 'Kneading' Method in a Nonaqueous System; J.Chem-Society, 1993 (559–660).
Article: Huo Qishenget al., First Syntheses of Pentasil–type Silica Zeolites from Non–Aqueous Systems J.ChemSociety, 1988 (pp 1486–1487).
Article: R. Aiello et al., Zeolite Crystallization From Dense Systems; Materials Engineering 1992, vol. 3 #3 (pp 407–416).

Primary Examiner—David Sample
(74) Attorney, Agent, or Firm—Penny L. Prater (57) ABSTRACT

An in-extrudate reaction mixture to be effectively crystallized is effectively crystallized to produce zeolitic or non-zeolitic molecular sieves. The reaction mixture is heated within a slowly rotating, double-walled reactor vessel wherein a heated medium is conducted within a space formed between the double walls of the vessel. Thus, the reaction mixture is contacted by a uniformly heated wall while being gently tumbled at low speed. The tumbling action serves to uniformly distribute the heat within the reaction mixture without subjecting the mixture to such shearing that could damage shaped particles. A relatively high quantity of reaction mixture can be handled in that way to maximize the production volumes and reduce production costs.

17 Claims, 2 Drawing Sheets

U.S. PATENT DOCUMENTS

| | | | |
|---|---|---|---|
| 3,702,886 A | | 11/1972 | Argauer et al. |
| 3,709,979 A | | 1/1973 | Chu |
| 3,773,690 A | | 11/1973 | Heinze et al. |
| 3,777,006 A | | 12/1973 | Rundell et al. |
| 3,832,449 A | | 8/1974 | Rosinski et al. |
| 4,016,245 A | | 4/1977 | Plank et al. |
| 4,058,586 A | | 11/1977 | Chi et al. |
| 4,073,865 A | | 2/1978 | Flanigen et al. |
| 4,076,245 A | | 2/1978 | Monroe |
| 4,091,007 A | | 5/1978 | Dwyer et al. |
| 4,226,837 A | * | 10/1980 | Achenbach et al. ........ 423/710 |
| 4,235,753 A | | 11/1980 | Brown et al. |
| 4,296,083 A | | 10/1981 | Rollmann |
| 4,310,440 A | | 1/1982 | Wilson et al. |
| 4,310,496 A | * | 1/1982 | Achenbach et al. ........ 423/712 |
| 4,371,510 A | * | 2/1983 | Christophliemk et al. .. 423/717 |
| 4,424,144 A | | 1/1984 | Pryor et al. |
| 4,440,871 A | | 4/1984 | Lok et al. |
| 4,490,342 A | | 12/1984 | Valyocsik |
| 4,522,705 A | | 6/1985 | Chu et al. |
| 4,556,447 A | | 12/1985 | Bradley et al. |
| 4,560,542 A | | 12/1985 | Robson |
| 4,567,029 A | | 1/1986 | Wilson et al. |
| 4,591,491 A | * | 5/1986 | Christophliemk et al. .. 423/711 |
| 4,661,334 A | * | 4/1987 | Latourrette et al. ......... 423/710 |
| 4,686,093 A | | 8/1987 | Flanigen et al. |
| 4,788,169 A | | 11/1988 | Degman, Jr. et al. |
| 4,913,799 A | | 4/1990 | Gortsema et al. |
| 4,973,785 A | | 11/1990 | Lok et al. |
| 4,977,120 A | | 12/1990 | Sakurada et al. |
| 5,053,373 A | | 10/1991 | Zones |
| 5,145,659 A | | 9/1992 | McWilliams |
| 5,166,111 A | | 11/1992 | Zones et al. |
| 5,240,892 A | | 8/1993 | Klocke |
| 5,514,362 A | | 5/1996 | Miller |
| 5,558,851 A | | 9/1996 | Miller |
| 5,716,593 A | | 2/1998 | Miller |
| 5,785,944 A | | 7/1998 | Miller |
| 5,785,945 A | | 7/1998 | Miller |
| 6,099,820 A | | 8/2000 | Miller |

* cited by examiner

METHODS FOR MAKING MOLECULAR SIEVES

FIELD OF THE INVENTION

The present invention relates to a method for producing molecular sieves.

BACKGROUND

Molecular sieves are a commercially important class of crystalline materials. They have distinct crystal structures with ordered pore structures which are demonstrated by distinct X-ray diffraction patterns. The crystal structure defines cavities and pores which are characteristic of the different species. Natural and synthetic crystalline molecular sieves are useful as catalysts and adsorbents. The adsorptive and catalytic properties of each molecular sieve are determined in part by the dimensions of its pores and cavities. Thus, the utility of a particular molecular sieve in a particular application depends at least partly on its crystal structure. Because of their unique sieving characteristics, as well as their catalytic properties, molecular sieves are especially useful in such applications as gas drying and separation and hydrocarbon conversion. The term "molecular sieve" as used herein refers to a material having a fixed, open-network crystalline structure, that may be used to separate hydrocarbons or other mixtures by selective occlusion of one or more of the constituents, or may be used as a catalyst in a catalytic conversion process.

Zeolitic Molecular Sieves

One type of molecular sieve is a crystalline zeolite. Crystalline zeolites may be divided into two general types based on crystal structure considerations. One type includes zeolites having a $SiO_2/Al_2O_3$ molar ratio in the crystalline lattice typically less than 12, which are conventionally prepared without an organic templating agent. Many of these zeolites also contain sodalite substructures, and have a tetrahedral atom density of less than about 15 $TO_2/1000$ Å$_3$. Zeolites having these general characteristics include, for example, zeolites A, N-A, ZK-4, faujasite, X, Y, ZK-5 and.

A number of processes have been offered for preparing crystalline zeolites of this type within discrete particles. For example, Howell, et al., in U.S. Pat. No. 3,119,660 teaches a method for producing crystalline metal aluminosilicate zeolite by reacting preformed bodies of clay particles in an aqueous reactant mixture including alkali metal oxide. Similar processes for preparing zeolites from formed bodies, which may contain zeolitic seed crystals, in alkali solutions are also taught in U.S. Pat. No. 4,424,144 to Pryor, et al., U.S. Pat. No. 4,235,753 to Brown, et al., U.S. Pat. No. 3,777,006 to Rundell et al., U.S. Pat. No. 3,119,659 to Taggart et al, U.S. Pat. No. 3,773,690 to Heinze et al., U.S. Pat. No. 4,977,120 to Sakurada et al and GB 2 160 517 A. U.S. Pat. No. 3,094,383 teaches a method of forming an A type zeolite by aging a homogeneous reaction mixture out of contact with an external aqueous liquid phase but under conditions to prevent the dehydration of the mixture. GB 1 567 856 discloses a method of preparing zeolite A by heating an extruded mixture of metakaolin powder and sodium hydroxide.

In U.S. Pat. No. 4,058,586, Chi et al. discloses a method for crystallizing zeolites within formed particles containing added powdered zeolite, where the formed particles furnish all of the liquid needed for crystallization. Crystallizing the particles in an aqueous alkaline solution is not required using the process of Chi et al.

Verduijn, in WO 92/12928, teaches a method of preparing binder-free zeolite aggregates by aging silica-bound extruded zeolites in an aqueous ionic solution containing hydroxy ions. According to the disclosure of Verduijn, the presence of zeolite crystals in the extrudate is critical for making strong crystalline zeolite extrudates. Verduijn, et al., in EPO A1/0,284,206, describe a method of preparing binderless zeolite L by forming silica and preferably 10–50 wt % preformed zeolite L crystallites into particles, and then reacting the particles with an alkaline solution containing a source of alumina to form the zeolite L. More recently, similar methods have been proposed for preparing high silica zeolitic materials. Conventional methods for preparing high silica materials, having a $SiO_2/Al_2O_3$ molar ratio of greater than about 10, and more typically greater than about 20, typically involves crystallizing the zeolites from aqueous solution. For example, U.S. Pat. No. 3,702,886 to Argauer, et al., teaches a method of preparing ZSM-5 from a solution containing tetrapropyl ammonium hydroxide, sodium oxide, an oxide of aluminum or gallium, an oxide of silica or germanium, and water. The digestion of the gel particles is carried out until crystals form. The crystals are separated from the liquid and recovered.

A variation of the preparation procedure involves using clay as a source of alumina in preparing high silica zeolites. For example, U.S. Pat. No. 4,091,007 discloses a method for preparing a crystalline aluminosilicate zeolite, specifically ZSM-4 or ZSM-5, from a reaction mixture where at least about 70 weight percent of the alumina is provided by an alumina-containing clay added to the reaction mixture. EPO A2/0,156,595, discloses the preparation of crystalline zeolites having a silica to alumina mole ratio greater than 12 and a Constraint Index of 1 to 12 by forming a mixture of seed crystals, a source of silica, a source of alumina and water into shaped particles, which are then crystallized in an aqueous reaction mixture containing a source of alkali cations. It is also taught that alumina-containing clay may be used as an alumina source. U.S. Pat. No. 4,522,705 is directed to a catalytic cracking catalyst comprising an additive prepared by the in-situ crystallization of a clay aggregate disclosed in EPO A2/0,156,595. U.S. Pat. No. 5,145,659 teaches methods for increasing the silica content of a zeolite supported on a matrix, where the matrix may be a clay.

Special methods for preparing the reaction mixture from which a zeolite may be crystallized have also been proposed. In U.S. Pat. No. 4,560,542 a dried hydrogel containing silica and alumina is contacted with a fluid medium containing an organic templating agent and maintained at specified crystallization conditions to form a crystalline aluminosilicate.

In U.S. Pat. No. 5,240,892 a reaction mixture containing at least about 30 weight percent solids content of alumina and precipitated silica is taught for preparing zeolites. The method of preparing the reaction mixture allows agitation of the mixture during crystallization, in spite of the high solids content of the mixture.

Zeolite crystallization from reaction mixtures initially containing a gel-like phase in equilibrium with an excess of liquid phase is disclosed in R. Aiello, et al., "Zeolite Crystallization from Dense Systems", Materials Engineering 1992, Vol. 3, n. 3, pp.407–416.

The traditional conventional method of manufacturing molecular sieves involves providing the reaction mixture with a sufficient amount of water to cause the crystallization to begin in the presence of an added external water phase. Such a high-water mixture is prepared in a gel tank and pumped into an autoclave reactor which may comprise a double-walled vessel through which hot oil is conducted to heat the mixture. The reactor includes a mechanical paddle-type of stirrer which stirs the mixture to distribute the heat. As noted above, crystallization occurs in the presence of a separate or external water phase, requiring that special measures be taken to separate water from the molecular sieves. Also, the separated water may have to be treated for environmental reasons.

More recently, methods have been devised for the manufacture of molecular sieves which avoids problems associated with the above-disclosed high-water methods. In that regard, low-water methods have been described, for example, in ZEOLITES, 1992, Vol 12, April/May, p. 343; ZEOLITES 1990, vol 10, November/December, p. 753; ZEOLITES 1989, vol 9, November, p. 468; Nature, Vol 317(12), September 1985, p. 157; and J. Chem. Soc., Chem. Commun., 1988, p. 1486. J. chem. Soc., Chem. Commun., 1993, p. 659 describes a kneading method for synthesizing ZSM-35 in a nonaqueous system, in which the amount of liquids used to prepare a crystallization mixture is not sufficient to wet all the solid particles so that the agglomerate reactant is actually a mixture of dry powder and small doughy lumps. The method can thus be considered to constitute a low water or in-extrudate method in that crystallization occurs in the absence of an external water phase.

A particularly advantageous low-water, or in-extrudate, process for preparing a crystalline zeolite has been discovered by one of the present inventors and disclosed in U.S. Pat. Ser. No. 5,558,851, the disclosure of which is incorporated by reference herein. For example, that patent discloses to prepare a reaction mixture which comprises at least one active source of a first oxide selected from the group consisting of an oxide of silicon, germanium or both, optionally at least one active source of a second oxide selected from the group consisting of an oxide of aluminum, boron, gallium, iron or a mixture thereof, an organic templating agent capable of forming the crystalline zeolite, and sufficient liquid, e.g., water, to shape the mixture. The mixture is heated at crystallization conditions and in the absence of an added external liquid phase for sufficient time to form a crystallized material containing crystals of the zeolite.

If it is desired to form the crystals from shaped or formed particles, it may be desirable to pre-dry the reaction mixture to remove water, leaving enough water to shape the mixture. That is, once the reaction mixture is formed into the desired shape, containing the desired amount of water, the resulting shape is self-supporting.

U.S. Pat. No. 5,785,945 (the disclosure of which is incorporated herein by reference), an in-extrudate method of preparing crystalline zeolite L is described. That method comprises preparing a reaction mixture comprising at least one active source of silica and at least one active source alumina in amounts sufficient to produce zeolite L, and sufficient water to produce zeolite L, and heating the reaction mixture at a temperature from about 100° C. to about 200° C. under crystallization conditions and in the absence of an added external liquid phase for sufficient time to form crystals of zeolite L.

An in-extrudate method for preparing crystalline Y zeolite is described in U.S. Pat. No. 5,785,944, the disclosure of which is incorporated by reference herein. That method comprises preparing a reaction mixture comprising at least one active, non-zeolitic source of silica and at least one active, non-zeolitic source of alumina in amounts sufficient to produce Y zeolite, and sufficient water to produce Y zeolite, and maintaining the reaction mixture at a temperature of up to about 130° C. under crystallization conditions and in the absence of an added external liquid phase for sufficient time to form crystals of Y zeolite.

Non-Zeolitic Molecular Sieves

In addition to zeolitic molecular sieves, there are also known non-zeolitic molecular sieves, such as aluminophosphates. Conventional high-water methods for preparing aluminophosphate-containing molecular sieves are taught, for example, in U.S. Pat. Nos. 4,310,440; 4,440,871; 4,567,029; 4,686,093; 4,913,799 and 4,973,785. An advantageous in-extrudate (low-water) method for producing non-zeolitic molecular sieves is disclosed in U.S. Pat. No. 5,514,362, the disclosure of which is incorporated by reference herein. In that method, non-zeolitic molecular sieves are prepared from a reaction mixture comprising self-supporting particles wherein the particles comprise active sources of the molecular sieve. More specifically, the method involves producing particles comprising at least one active source of phosphorous, at least one active source of alumina, an organic templating agent capable of forming the molecular sieve and sufficient water to shape the particles. The particles are maintained at crystallization conditions for sufficient time to form a crystallized product comprising crystals of the molecular sieve.

Due to the relatively low quantity of water in the reaction mixture used in the low-extrudate methods of making zeolite or non-zeolite molecular sieves, it is not possible to use a conventional mechanical stirrer since the stirrer would encounter too much resistance in the high-solids mixture (in contrast to the low resistance encountered in the low-solids mixture used in the conventional methods). For the same reason, if a low water method using a reaction mixture comprised of formed particles were being used, a conventional mechanical stirrer would impart considerable shearing forces to the formed particles which could break those particles. On the other hand, in the absence of a thorough mixing of the reaction mixture during the heating phase, the reaction mixture will not be uniformly heated; and if formed particles are present in the reaction mixture, clumping of those particles could occur.

Those problems might be alleviated by using a smaller quantity of reaction mixture in the reactor, but then the rate of production would be undesirably reduced.

OBJECTS AND SUMMARY OF THE INVENTION

Accordingly, it is an object of the present invention to provide a novel method for preparing molecular sieves.

Another, object is to provide such a method which enables molecular sieves to be produced from either powder or formed particles.

A further object is to provide such a method which can be used in the presence of either high or low water levels.

Another object is to provide such a method which uses a low water volume while achieving a highly uniform and rapid distribution of heat to a reaction mixture, without breakage or clumping of shaped particles.

Still a further object is to provide such a method which maximizes the amount of molecular sieve per unit volume of product.

Still another object is to provide such a method which involves the production of either zeolitic or non-zeolitic molecular sieves.

A method has been discovered which surprisingly enables an in-extrudate reaction mixture to be effectively crystallized to produce zeolitic or non-zeolitic molecular sieves.

The reaction mixture is heated within a slowly rotating, double-walled reactor vessel wherein a heated medium is conducted within a space formed between the double walls of the vessel. Thus, the reaction mixture is contacted by a uniformly heated wall while being gently tumbled at low speed. The tumbling action serves to uniformly distribute the heat within the reaction mixture without subjecting the mixture to such shearing that could damage shaped particles. A relatively high quantity of reaction mixture can be handled in that way to maximize the production volumes and reduce production costs.

Moreover, the method is applicable to conventional high-water methods as well as to low-water methods of making either zeolitic or non-zeolitic molecular sieves.

BRIEF DESCRIPTION OF THE DRAWINGS

The objects and advantages of the invention will become apparent from the following detailed description of preferred embodiments thereof in connection with the accompanying drawings, in which like numerals designate like elements, and in which.

DETAILED DESCRIPTION OF PREFERRED EMBODIMENTS OF THE INVENTION

Crystallization Apparatus

Depicted in the figures is an apparatus which has surprisingly been discovered to be particularly effective at producing commercially significant quantities of molecular sieves in accordance with the method according to the invention.

The apparatus is primarily intended for use in an in-extrudate (low-water) process which occurs in the absence of an external liquid phase as described earlier herein.

However, the apparatus could be used in the high-water processes where the crystallization occurs in an added external liquid phase.

The present invention can be employed to produce zeolitic or non-zeolitic molecular sieves as will be discussed.

Figure 1:
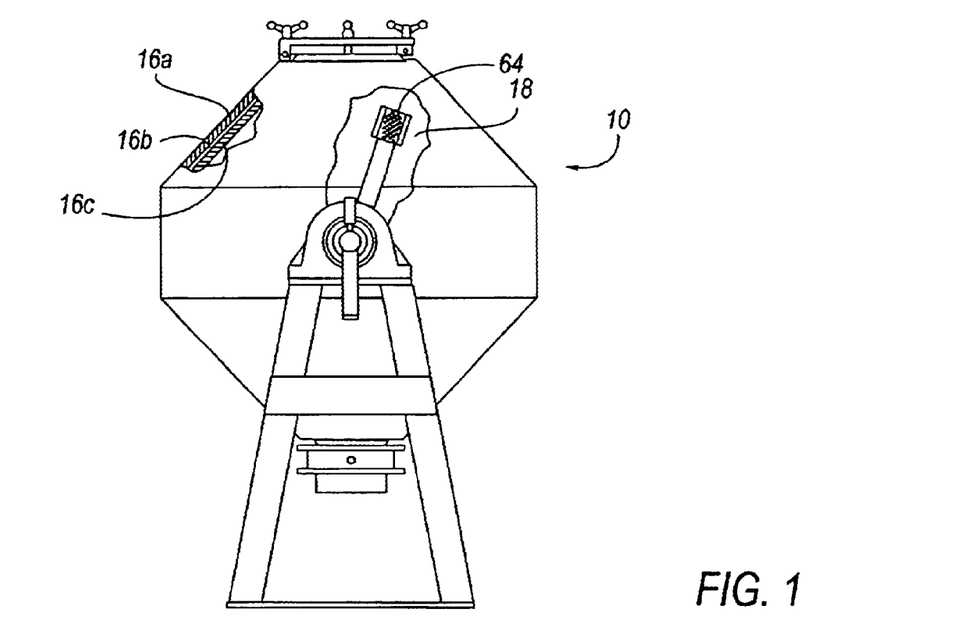
FIG. 1 is an end view of a reactor suitable for use in carrying out the process of the present invention, with an end wall broken away.
Figure 2:
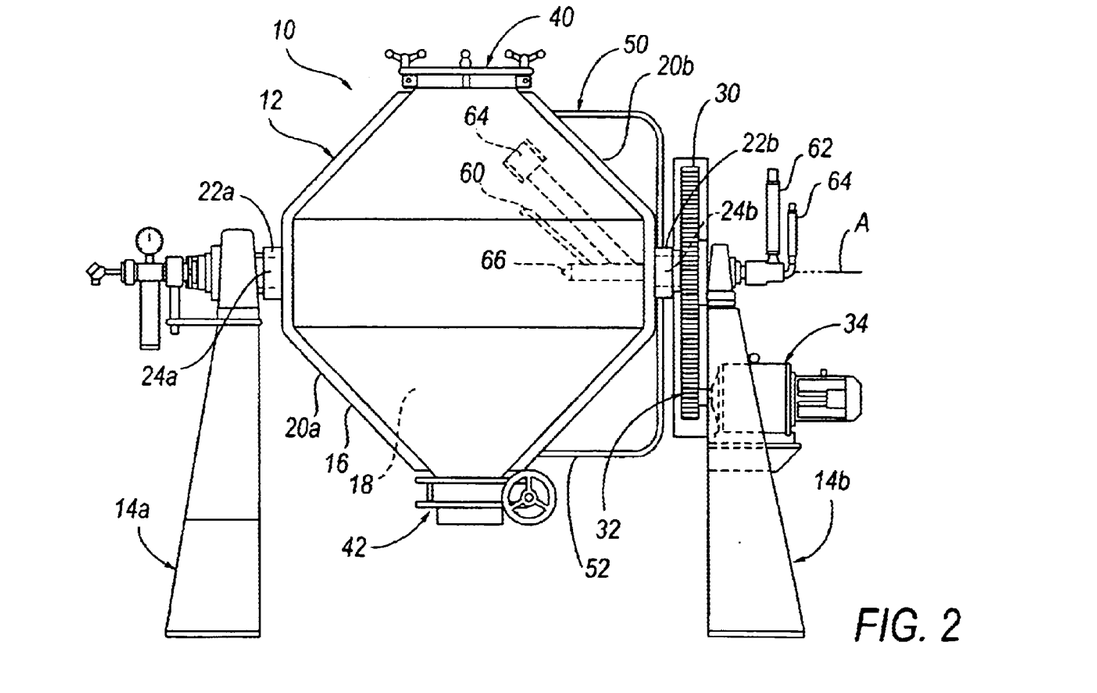
FIG. 2 is a side view of the reactor of FIG. 1.

The apparatus 10 comprises a double-cone vessel 12 mounted on a pair of stationary supports 14a, 14b for rotation about an axis A which is horizontal or possibly inclined relative thereto. The vessel 12 includes a shell structure 16 forming a chamber 18 therein. The shell structure forms a pair of generally frusto cones 20a, 20b disposed coaxially along the axis A and with their large-diameter ends facing one another. Alternatively, the shell structure could be cylindrical.

The vessel 12 is mounted on shaft sections 22a, 22b which are mounted on respective cylindrical supports 24a, 24b for rotation about the axis A. One of the shaft sections 22b is attached to a drive gear 30 which is driven by a speed reduction transmission 32 that is operably connected to a motor 34. By activating the motor 34, the vessel 12 can be rotated about the axis A.

The vessel includes an openable cover 40 at its upper end, and a discharge valve 42 at its lower end. By opening the cover, a reaction mixture can be loaded into the vessel, and by opening the valve 42, crystalline materials can be discharged from the vessel.

The shell structure 16 is a double-wall structure that includes inner and outer shells 16a, 16b spaced apart to form a passageway 16c therebetween. Connected to respective regions of the passage 16c are first ends of fluid inlet and outlet conduits 50, 52. Second ends of those conduits 50, 52 are connected to the shaft section 22b, whereby the conduits are rotatable with the shell structure. The second ends of the conduits communicate with respective bores (not shown) disposed in the shaft section 22b. One of the bores, i.e., the bore connected to the inlet conduit 50, is connected to a source of pressurized heated medium, preferably a liquid such as an oil, for conducting that medium to the passage 16c for circulation therein to heat the chamber 18. The heated medium is discharged from the passage 16c to be re-heated and then recirculated through the passage.

A stationary nozzle 60 is disposed in the chamber 18 and connected to a bore disposed in the support section 24b for conducting a liquid, such as a template, into the chamber 18. A liquid feed conduit 62 supplies the liquid to the nozzle. A conduit 64 communicates with a bore formed in the support section 24b for evacuating gas from the chamber 18. A thermocouple 66 is connected to the support section 24a for measuring the temperature of the chamber.

One preferred apparatus is a reinforced version of a commercially available dryer, called a Rota-Cone Vacuum Dryer which can be purchased from Paul O. Abbe, Inc. of Little Falls, N.J. The dryer has been conventionally used for the vacuum drying of catalysts and the impregnation of catalysts, but not for crystallization.

Other types of heated rotary vessels could be used, however, in carrying out the present invention.

In practice, the reaction mixture is introduced into the reaction chamber of the reactor after opening the cover 40. A heated oil is conducted through the space defined between the double walled structure of the vessel while the vessel is rotated.

The oil is at a temperature to produce the desired heating of the mixture. Usually a temperature in the range of 80° C. to 200° C. will suffice. Rotation of the vessel is generally performed slowly, the speed depending upon the type of reaction mixture that is being mixed. If a low-water method is used in which the reaction mixture is comprised of formed particles, the speed should be less than a speed that would produce considerable breakage of the formed particles. Tests performed to date suggest that the rotary speed should probably not significantly exceed about 10 rpm. The gentle tumbling of the reaction mixture will produce a highly uniform and rapid distribution of heat within the mixture without applying an excessive shearing action that could damage shaped particles within the mixture. Also, clumping of the particles is prevented.

Of course, if a low water method utilizing a powderous reaction mixture is being employed, or if a high water method is employed, then higher speeds are possible.

Crystalline material (i.e., "seed" crystals) may optionally be added to the reaction mixture prior to the crystallization step for enhancing the crystallization process.

If a template is to be added, it can be combined with the reaction mixture when that mixture is being produced, if the template is not volatile. If a volatile template is to be added, it can be introduced separately into the reaction chamber via the nozzle 60 to avoid exposing a volatile template to ambient air.

As the vessel is heated, the temperature and pressure in the reaction chamber will increase. The reactor vessel is suitably reinforced to withstand such pressures. If desired, air can be evacuated from the reaction chamber via conduit 64 after the reaction mixture has been introduced, in order to minimize the pressure occurring in the vessel.

It has been found that crystallization can be achieved much sooner and more reliably than with conventional methods, e.g., within 1 to 48 hours, depending upon the type of molecular sieves being produced.

At the end of the run, the product is allowed to cool. If desired, the pressure in the reaction chamber can be vented via conduit 64. That helps to cool the product, as well as to remove steam, to facilitate subsequent drying of the product. In addition, if a volatile template was used, it can be recovered as a result of such venting, and then recycled for subsequent re-use.

The oil conducted through the double-walled vessel is cooled by being passed through a heat-exchanger, thereby promoting the cooling action.

The product is eventually removed from the vessel through the discharge valve 42 and then processed in various conventional ways, to form the final product.

Although it is preferred that the above-described method be utilized for an in-extrudate (low-water reaction), it could be used in a conventional high-water process.

Figure 3:
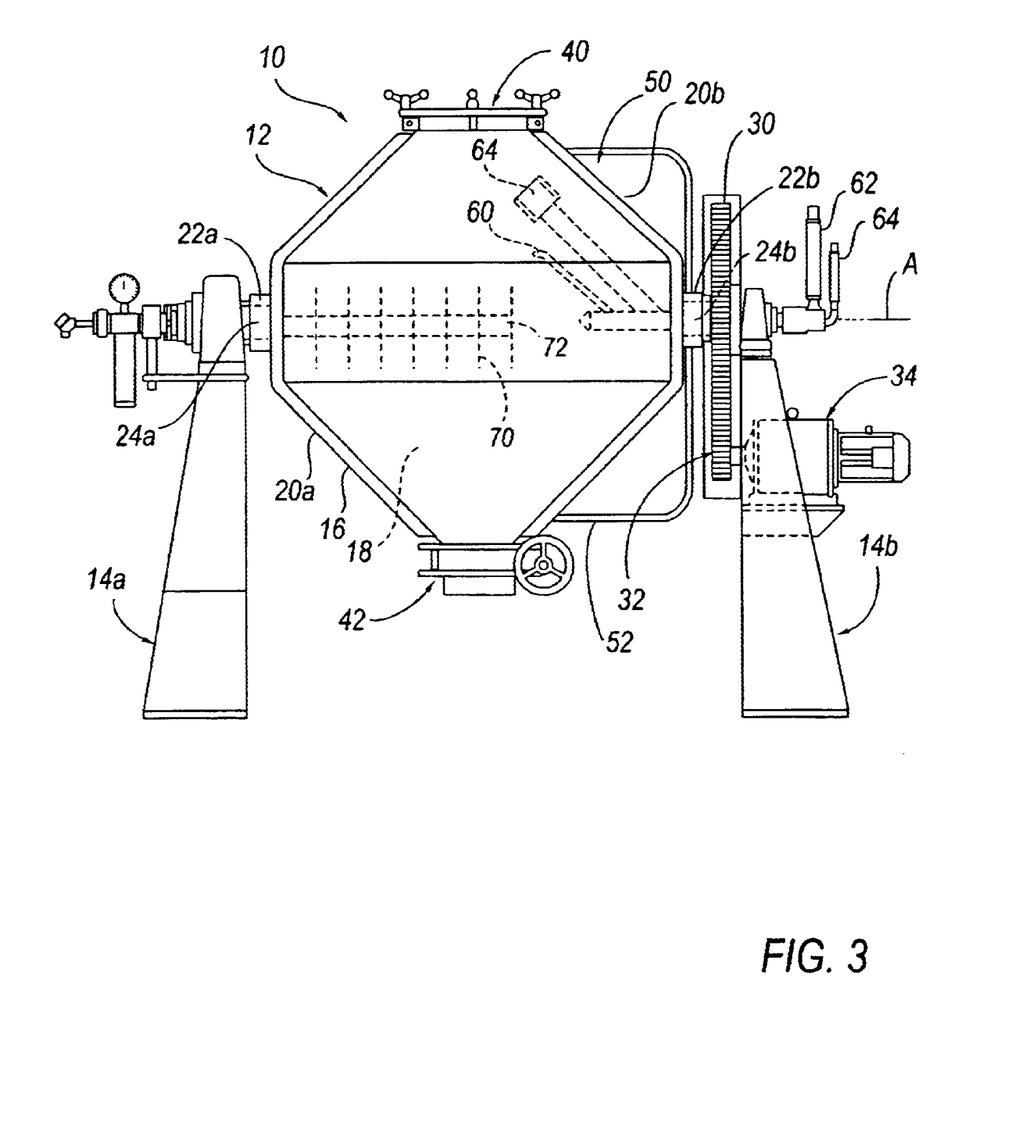
FIG. 3 is a side view of a modified reactor.

In cases where the reaction mixture does not comprise formed particles, it would be possible in that case to provide an agitator in the reaction chamber, e.g., an agitator in the form radial tines 70 projecting from a shaft 72 that is rotated by a separate motor 74 (see FIG. 3). The use of an agitator is acceptable since there would be no risk of breaking shaped particles.

Preparing the Reaction Mixture for Producing Zeolitic Molecular Sieves

The reaction mixture from which and in which zeolitic molecular sieves are crystallized in the vessel 12 comprises at least one active source of silica, and (optionally) an organic templating agent. If shaped crystals are desired, the reaction mixture can be dried by being pre-heated prior to the reaction, to remove water.

Zeolites having a very high silica to alumina ratio are within the scope of the process, included zeolites having a silica to alumina mole ratio of greater than 100. Also included are zeolites which are essentially aluminum free. Especially when commercial silica sources are used, aluminum is almost always present to a greater or lesser degree. Thus, by "aluminum free" is meant that no aluminum is intentionally added to the reaction mixture, e.g., as an alumina or aluminate reagent, and that to the extent aluminum is present, it occurs only as a contaminant in the reagents. Other metallic components which may be added to the reaction mixture include, for example, titanium, chromium, germanium, gallium, iron, boron and alkali and alkaline earth metals.

Typical sources of silicon oxide ($SiO_2$) include silicates, silica hydrogel, silicic acid, colloidal silica, fumed silica, tetraalkyl orthosilicates silica hydroxides, precipitated silica and clays. Typical sources of aluminum oxide ($Al_2O_3$) when used in the reaction mixture include aluminates, alumina, and aluminum compounds such as $AlCl_3$, $Al_2(SO_4)_3$, aluminum hydroxide ($Al(OH)_3$)), kaolin clays, and other zeolites. Titanium, chromium, germanium, gallium, iron, boron can be added in forms corresponding to their aluminum and silicon counterparts. Salts, particularly alkali metal halides such as sodium chloride, can be added to or formed in the reaction mixture.

An organic templating agent capable forming the zeolite may be included in the reaction mixture. Typically, the templating agent will be an organic compound which contains nitrogen or phosphorus. The sources of organic nitrogen-containing cations may be primary, secondary or tertiary amines or quaternary ammonium compounds, depending on the particular zeolite product to result from crystallization from the reaction mixture. Non-limiting examples of quaternary ammonium compounds include salts of tetramethylammonium, tetraethylammonium, tetrapropylammonium, tetrabutylammonium, diethylammonium, triethylammonium, dibenzylammonium, dibenzyldimethylammonium, dibenzyidiethylammonium, benzyltrimethylammonium and 2-(hydroxylalkyl)trialkylammonium, where alkyl is methyl, or ethyl or a combination thereof. Non-limiting examples of amines useful in the present process include the compounds of trimethylamine, triethylamine, tripropylamine, ethylenediamine, propanediamine, butanediamine, pentanediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine. Amines useful herein are those having a $pK_a$, in the range of between about 7 and about 12. It is an important feature of the present invention that the amount of templating agent required for the crystallization step is reduced relative to conventional zeolitic crystallization procedures. Thus, the molar ratio of templating agent to silica in the reaction mixture will be in the range of from zero (0) to about 0.5, preferably from about 0.01 to about 0.5, more preferably from about 0.01 to about 0.3.

The reaction mixture may also comprise one or more active sources of alkali metal oxide. Sources of lithium, sodium and potassium, are preferred. Any alkali metal compound which is not detrimental to the crystallization process are suitable here. Non-limiting examples include oxides, hydroxides, nitrates, sulfates, halogenides, oxalates, citrates and acetates. In the reaction mixture, the alkali metal/silica molar ratio is preferably in the range from zero (0) to about 1.0 and more preferably in the range from about 0.05 to about 0.6. The alkali metal compound may also contribute $OH^-$. Generally, zeolite synthesis is facilitated by the presence of $OH^-$ in the reaction mixture at a molar ratio $OH^-/SiO_2$ of about 0.05 to about 0.5, and preferably from about 0.05 to about 0.4. The range of $H2O/SiO_2$ is preferably about 0.5 to about 8, more preferably about 1 to about 6.

Description of Zeolites

Specific, non-limiting examples of crystalline zeolites which may be prepared by the present method include Y, L, ZSM-5, ZSM-11, ZSM-12, ZSM-22, ZSM-23, SSZ-35, ZSM-38, beta, SSZ-32, silicalite and other similar materials.

The in-extrudate (low-water) preparation of Y-faujasite with a silica/alumina mole ratio from 6 to 15 is described in U.S. Pat. No. 5,716,593, the disclosure of which is incorporated herein by reference. That patent describes preparing a reaction mixture comprising at least one active source of silica, at least one active source of alumina, and an organic templating agent capable of producing the Y-type faujasite in amounts in sufficient to produce the Y-type faujasite, and sufficient water to produce the Y-type faujasite. The reaction mixture is maintained at a temperature up to about 130° C. under crystallization conditions and in the absence of an added external liquid phase for sufficient time to form crystals of the Y-type faujasite.

The in-extrudate preparation of L zeolite is described in U.S. Pat. No. 5,785,945, the disclosure of which is incorporated herein by reference. That patent describes preparing a self-supporting reaction mixture comprising at least one active source of silica, at least one active source of alumina and a source of hydroxide in amounts sufficient to produce zeolite L, and sufficient water to shape said mixtures wherein the reaction mixture has an OH—/$SiO_2$ molar ration of 0.2 to 0.4. After the mixture has been formed into a shape, it is heated at a temperature of about 90° C. to about 200° C. under crystallization conditions and in the absence of an added external liquid phase for sufficient time to form crystals of zeolite L.

The in-extrudate preparation of Y zeolite (non-templating) with a silica/alumina mole ratio from 4.5 to 6 is described in U.S. Pat. No. 5,785,944, the disclosure of which is incorporated herein by reference. That patent describes preparing, in the absence of added binder, a self-supporting reaction mixture comprising at least one active, non-zeolitic source of silica, at least one active, non-zeolitic source of alumina, and a source of hydroxide in amounts sufficient to produce Y zeolite, and sufficient water to produce Y zeolite, wherein the reaction mixture has an $OH$—$/SiO_2$ molar ratio of 0.2 to 0.3. The reaction mixture is maintained at a temperature of up to about 130° C. under crystallization conditions and in the absence of an added external liquid phase for sufficient time to form crystals of Y zeolite.

The in-extrudate preparation of crystalline zeolite crystals having a first oxide/second oxide molar ratio greater than 12 is described in U.S. Pat. No. 5,558,851, the disclosure of which is incorporated herein by reference. That patent describes preparing a reaction mixture comprising at least one active source of a first oxide selected from the group consisting of an oxide of silicon, germanium or both, optionally at least one active source of a second oxide selected from the group consisting of an oxide of aluminum, boron, gallium, iron or a mixture thereof, an organic templating agent capable of forming crystalline zeolite, and sufficient water to shape the mixture. The reaction mixture is heated at crystallization conditions, in the absence of an added external liquid phase, for sufficient time to form a crystallized material containing crystals of the zeolite. Included in the group of zeolite crystals that can be produced using this method are ZSM-5, SSZ-35, beta, boron beta, ZSM-12, ZSM-22, silicalite, ZSM-11, ZSM-23, and SSZ-32.

Zeolite ZSM-5 and the in-extrudate preparation thereof are described in U.S. Pat. No. 5,558,851, the disclosure of which is incorporated herein by reference. The reaction mixture from which ZSM-5 can be suitably prepared is formed by mixing sources of silica and alumina with a templating agent, preferably tetrapropylammonium hydroxide, and sources of an alkali metal oxide, preferably sodium oxide.

Zeolite SSZ-35, and the conventional (i.e., high water) preparation thereof, are disclosed in pending patent application U.S. Ser. No. 959,205, the disclosure of which is incorporated herein by reference. The aqueous reaction mixture prepared in the process for making SSZ-35 zeolites contains sources of an alkali metal oxide, a relatively rigid polycyclic ring system templating agent having a quaternary nitrogen heteroatom (eg. N,N-dimethyl-4-azoniatricyclo $[5.2.2.0^{(2,6)}]$ undec-8-ene cation), an oxide of aluminum, boron, gallium, iron or mixtures thereof, and an oxide of silicon or germanium, or mixture of the two.

Zeolite beta and the conventional preparation thereof are described in U.S. Pat. No. 3,308,069, the disclosure of which is incorporated herein by reference. The reaction mixture from which zeolite beta can be suitably prepared is formed by mixing sources of silica and alumina with a templating agent, preferably tetraethylammonium hydroxide (TEAOH), and sources of an alkali metal oxide, preferably sodium oxide. The crystallization procedures can be satisfactorily carried out at temperatures within the range from about 75° C. to about 200° C. Heating under autogenous pressure is carried out until desired crystalline zeolite product is formed.

Zeolite boron beta and the conventional preparation thereof are described in U.S. Pat. Nos. 4,788,169 and 5,166,111, the disclosures of which are incorporated herein by reference. Boron beta zeolites can be suitably prepared from a reaction mixture containing sources of an alkali metal borate, a templating agent such as tetraethylammonium hydroxide or bis(1-azonia, bicyclo[2.2.2]octane)-, alkane diquaternary ammonium ion, and an oxide of silicon or germanium, or mixture of the two.

Zeolite ZSM-12 and the conventional preparation thereof are described in U.S. Pat. No. 3,832,449, the disclosure of which is incorporated herein by reference. Zeolite ZSM-12 can be suitably prepared by preparing a reaction mixture containing tetraethyl ammonium cations, sodium oxide, an oxide of aluminum or gallium, an oxide of silica or germanium, and water. Thereafter, the crystals are separated from the liquid and recovered. Typical reaction conditions consist of heating the foregoing reaction mixture to a temperature of from about 80° C. to 180° C. A more preferred temperature range is from about 150° C. to 170° C. with the amount of time at a temperature in such a range being from about 3 hours to 4 days.

ZSM-22 and the conventional preparation thereof are described in U.S. Pat. No. 4,556,477, the disclosure of which is incorporated herein by reference. Zeolite ZSM-22 can be suitably prepared by preparing a reaction mixture containing an alkali metal oxide, a source of silica, an organic compound of an element of Group IVB, including nitrogen or phosphorous which contains at least one alkyl or aryl group having at least 2 carbon atoms. The reaction mixture is maintained at crystallization conditions until crystals of the zeolite are formed. Thereafter, the crystals are separated from the liquid and recovered. Typical reaction conditions consist of heating the foregoing reaction mixture to a temperature of from about 80° C. to 200° C. for a period of time of from about 1 hour to 10 days.

Silicalite and the conventional preparation thereof are described in U.S. Pat. No. 4,073,865, the disclosure of which is incorporated herein by reference. Furthermore, the reaction mixture used in the preparation of silicalite has no added active sources of alumina. Thus, the sources of alumina in the reaction mixture are present at very low, i.e., impurity, levels. The templating agent useful for the crystallization of silicalite is preferably a quaternary cation having the formula $(R_4X)^+$, in which each R represents hydrogen or an alkyl group containing from 2 to 6 carbon atoms, and X represents phosphorus or nitrogen. The reaction mixture thus provides is heated at a temperature of from 100° C. to 200° C. until a crystalline hydrated precursor is formed, usually about 1 hour to 10 days, isolating said crystalline precursor and calcining same at a temperature of from 400° C. to 1000° C.

Zeolite ZSM-11 and the conventional preparation thereof are described in U.S. Pat. No. 3,709,979, the disclosure of which is incorporated herein by reference. Zeolite ZSM-35 and the conventional preparation thereof are described in U.S. Pat. No. 4,016,245, the disclosure of which is incorporated herein by reference. ZSM-38 and the conventional preparation thereof are described in U.S. Pat. No. 4,046,859, the disclosure of which is incorporated herein by reference.

Zeolite ZSM-23 and the conventional preparation thereof are described in U.S. Pat. Nos. 4,076,842, 4,296,083 and 4,490,342, the disclosure of which, and particular the methods of preparation and the templating agents used in the preparation, are incorporated herein by reference. Zeolite SSZ-32 and the conventional preparation thereof are described in U.S. Pat. No. 5,053,373, the disclosure of which is also incorporated herein by reference. ZSM-23 type zeolites can be suitably prepared from a reaction mixture containing sources of an alkali metal oxide, a templating agent, an oxide of aluminum, and preferably wherein the aluminum oxide source provides aluminum oxide which is in a covalently dispersed form on silica, and an oxide of silicon. These types can also be prepared utilizing the in-extrudate (low water) method and without an organic template, as described in U.S. Pat. No. 6,099,820.

Preparation of Non-Zeolitic Molecular Sieves

As noted earlier, the invention can be used to prepare non-zeolitic molecular sieves, such as aluminophosphate molecular sieves. The in-extrudate preparation of such molecular sieves is disclosed in U.S. Pat. No. 5,514,362, the disclosure of which is incorporated hereby reference. The non-zeolitic molecular sieve is a molecular sieve having a three-dimensional microporous crystalline framework structure comprising $[AlO_2]$ and $[PO_2]$ oxide units. The non-zeolitic molecular sieve may optionally contain silicon and/or one or more metals other than aluminum which will form oxide linkages in tetrahedral coordination with the aluminum and phosphorous in a crystalline framework. As disclosed in the patent, a reaction mixture, e.g., in gel form, is produced into particles comprising at least one active source of phosphorous, at least one active source of alumina, an organic templating agent capable of forming the molecular sieve, and sufficient water to make the particles. The particles are maintained at crystallization conditions comprising crystals of the molecular sieve.

EXAMPLES

Example 1

1800 grams of silica (HiSil 233, a hydrated silica manufactured by PPG) were placed in a Baker-Perkins mixer. To this were added 78 grams of $NaAlO_2$ with mixing. Then 1344 grams of a 35% aqueous solution of tetraethylammonium hydroxide (TEAOH) and 144 grams of a 50% aqueous solution of NaOH were added with mixing. Then were added 187.2 grams of acid-peptized and neutralized Versal 250 alumina (45 wt % $Al2O3$, 55 wt % $H2O$) followed by 84 grams of kaolin clay and 18 grams Beta zeolite. To this was added 1035 grams of deionized water and mixed at 140° F. until the mix went to a paste. The mix was then heated to 160° F. with slow mixing until it reached an extrudable form (volatiles level of 55% by LOI). The mix was extruded through a 1/16-inch die using a Ram extruder, and placed on a screen to dry at room temperature to a volatiles content of 45 wt %. Molar ratios in the extrudate were as follows:

$R^+/SiO2=0.12$
$OH^-/SiO2=0.18$
$M^+/SiO2=0.10$
$SiO2/Al2O3=34$
$H2O/SiO2=2.3$

The mix was then charged to a 0.5 cu. ft. working capacity Abbe Roto-Cone vessel rated at 200 psig and 375° F. After sealing the vessel, the oil inlet temperature was set to 310° F., and the vessel rotated at 1 rpm. The temperature in the vessel lined out at about 300° F. after about 90 minutes. The run was continued for another 24 hours. The maximum pressure in the unit during the run was 45 psig. The oil was then brought to room temperature. The unloading ball valve on the unit was opened and the extrudates dumped into a container. Little, if any attrition was evident. The extrudates were then washed three times with hot water brought to pH 11 with KOH, dried overnight at 120° C. in a vacuum oven, then calcined at 1100° F. for seven hours. X-ray diffraction analysis showed the catalyst to contain about 83% Beta zeolite.

Example 2

12,000 grams of HiSil 233 were placed in a Littleford mixer. To this were added 240 grams of $NaAlO_2$ and 120 grams of kaolin clay, and mixed for 15 minutes. Next were added 12,000 grams of a 35% aqueous solution of TEAOH, followed by 640 grams of a 50% aqueous solution of NaOH, then 240 grams of $NaNO_3$ and 40 grams of $Na_2B_2O_4.8H_2O$, and mixed for three hours. Then 20 grams of Beta zeolite were added and mixed for another 15 minutes. Steam heat, at 160° F., was applied to the mixer jacket to reduce volatiles level in the mix to 51.5 wt %. The mix was then dumped out of the mixer and loaded into the Abbe crystallizer. Molar ratios in the mix were as follows:

$R^+/SiO2=0.16$
$OH^-/SiO2=0.20$
$M^+/SiO2=0.08$
$SiO2/Al2O3=94$
$H2O/SiO2=2.5$

The mix was crystallized for 48 hours at 280° F. (oil inlet temperature of 300° F.) with a rotation speed of 10 rpm. At the conclusion of the run, the unit was cooled to room temperature and the catalyst was dumped through the ball valve. The catalyst was then washed three times with a three-fold excess of a 10% ammonium nitrate solution containing 6 grams of nitric acid per 1000 grams of solution. The catalyst was then dried in a vacuum oven overnight at 120° C., then calcined in air at 1100° F. for six hours. X-ray diffraction analysis showed the catalyst to be about 100% Beta zeolite.

Example 3

6000 grams of HiSil WB-15D silica were placed in a Littleford mixer. To this were added 1500 grams of 98% tetrapropylammonium bromide (TPA-Br) and mixed for 15 minutes. Next were added 3000 grams of a 35% aqueous solution of TEAOH and mixed for three hours. The mix was then dumped out of the mixer and loaded into the Abbe crystallizer. Molar ratios in the mix were as follows:

$R^+/SiO2=0.14$
$OH^-/SiO2=0.08$
$H2O/SiO2=3.2$

The mix was crystallized for 20 hours at 280° F. with a rotation speed of 10 rpm. At the conclusion of the run, the unit was cooled to room temperature and the catalyst was dumped through the ball valve. The catalyst was then washed three times with a three-fold excess of a 10% ammonium nitrate solution containing 6 grams of nitric acid per 1000 grams of solution. The catalyst was then dried in a vacuum oven overnight at 120° C., then calcined in air at 1100° F. for six hours. X-ray diffraction analysis showed the catalyst to be about 100% ZSM-5 zeolite.

What is claimed is:

1. A method for making a molecular sieve, said method comprising:

A) preparing a reaction mixture capable of crystallizing into molecular sieves when suitably heated;

B) introducing the reaction mixture into a reaction chamber formed by a double-walled reactor vessel; and C) passing a heated medium through a space defined between the double walls of the reactor vessel while rotating the vessel, to cause the reaction mixture to attain a substantially uniform temperature at crystallization conditions.

2. The method according to claim 1 wherein the reactor vessel is rotated about a generally horizontal axis in step C.

3. The method according to claim 1 wherein the reaction mixture includes sufficient liquid to shape the mixture.

4. The method according to claim 3, wherein a temperature of the heating liquid is in the range of 80 to 200° C. in step C.

5. The method according to claim 1, wherein a temperature of the heating liquid is in the range of 80 to 200° C. in step C.

6. The method according to claim 1, wherein step A further comprises preparing a reaction mixture capable of crystallizing into zeolitic molecular sieves.

7. The method according to claim 1 wherein step A further comprises preparing a reaction mixture capable of crystallizing into non-zeolitic molecular sieves.

8. The method according to claim 1, wherein step A includes preparing a reaction mixture comprising at least one active source of a first oxide selected from the group comprising an oxide of silicon, germanium or both, optionally at least one active source of a second oxide selected from the group comprising an oxide of aluminum, boron, gallium, iron or a mixture thereof.

9. The method according to claim 8, wherein the first oxide comprises silicon and said second oxide comprises aluminum; and wherein the silica/alumina molar ratio is at least 12.

10. The method according to claim 8, wherein the first oxide comprises silicon and said second oxide comprises aluminum; and wherein the silica/alumina molar ratio is less than 12.

11. The method according to claim 1 wherein
step A further comprises:
preparing a reaction mixture comprising at least one active source of silica, at least one active source of alumina, and an organic templating agent in amounts sufficient to produce Y-type faujasite having a silica/alumina mole ratio from 6 to 15; and sufficient water to produce the Y-type faujasite; and
step C comprising:
maintaining said reaction mixture at a temperature up to about 130° C. under crystallization conditions and in the absence of an added external liquid phase for sufficient time to form crystals of the Y-type faujasite.

12. The method according to claim 1 wherein
step A further comprises:
preparing a self-supporting reaction mixture comprising at least one active source of silica at least one active source of alumina and a source of hydroxide in amounts sufficient to produce zeolite L, and sufficient water to shape said mixtures, and forming said reaction mixture into a shape;
step C further comprising:
heating said reaction mixture at a temperature of about 90° C. to about 200° C. under crystallization conditions and in the absence of an added external liquid phase for sufficient time to form crystals of zeolite L.

13. The method according to claim 1 wherein
step A further comprises:
preparing a self-supporting reaction mixture comprising at least one active, non-zeolitic source of silica, at least one active, non-zeolitic source of alumina, and a source of hydroxide in amounts sufficient to produce Y zeolite; and having a silica/alumina mole ratio from 4.5 to 6, and sufficient water to produce the Y zeolite; and
step C further comprising:
maintaining said reaction mixture at a temperature of up to about 130° C. under crystallization conditions and in the absence of an added external liquid phase for sufficient time to form crystals of the Y zeolite.

14. The method according to claim 1 wherein
step A further comprises:
preparing a reaction mixture comprising at least one active source of a first oxide selected from the group consisting of an oxide of silicon, germanium or both, optionally at least one active source of a second oxide selected from the group consisting of an oxide of aluminum, boron, gallium, iron or a mixture thereof, an organic templating agent capable of forming said crystalline zeolite, and sufficient water to shape said mixture; and
step C further comprising:
heating said reaction mixture at crystallization conditions and in the absence of an added external liquid phase for sufficient time to form a crystallized material containing crystals of said zeolite, wherein said zeolite crystals have a first oxide/second oxide molar ratio greater than 12.

15. The method according to claim 1 wherein
step A further comprises preparing a template-free reaction mixture comprising at least one active source of a first oxide selected from the group consisting of an oxide of silicon, germanium or both, optionally at least one active source of a second oxide selected from the group consisting of an oxide of aluminum, boron, gallium, iron or a mixture thereof, and sufficient water to shape said mixture; and
step C further comprising:
heating said reaction mixture at crystallization conditions and in the absence of an added external liquid phase for sufficient time to form a crystallized material containing zeolite ZSM-5 crystals having a first oxide/second oxide molar ratio greater than 12.

16. The method according to claim 1 wherein
step A further comprises: preparing a self-supporting reaction mixture comprising at least one active source of silica, at least one active source of alumina, and an organic templating agent capable of forming beta zeolite, and sufficient water to shape said mixture; and
step C further comprising:
heating said reaction mixture at a temperature of about 75° C. to about 200° C. under crystallization conditions and in the absence of external liquid phase for sufficient time to produce beta zeolite.

17. A process for preparing a non-zeolitic molecular sieve comprising:
A) producing a reaction mixture comprising:
i. at least one active source of phosphorous,
ii. at least one active source of alumina,
iii. an organic templating agent capable of forming the molecular sieve; and
B) introducing the reaction mixture into a reaction chamber formed by a double-walled reactor vessel; and
C) passing a heated medium through a space defined between the double walls of the reactor vessel while rotating the vessel to cause the particles to attain a substantially uniform temperature at crystallization conditions.

* * * * *